(12) United States Patent
Miyazaki et al.

(10) Patent No.: US 12,218,417 B2
(45) Date of Patent: Feb. 4, 2025

(54) RADOME

(71) Applicant: The Yokohama Rubber Co., LTD., Tokyo (JP)

(72) Inventors: Teruki Miyazaki, Kanagawa (JP); Yukihiro Kamimura, Kanagawa (JP); Tomohiro Ito, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/260,726

(22) PCT Filed: Sep. 2, 2021

(86) PCT No.: PCT/JP2021/032275
§ 371 (c)(1),
(2) Date: Jul. 7, 2023

(87) PCT Pub. No.: WO2022/153588
PCT Pub. Date: Jul. 21, 2022

(65) Prior Publication Data
US 2024/0063534 A1    Feb. 22, 2024

(30) Foreign Application Priority Data
Jan. 13, 2021  (JP) ................................ 2021-003624

(51) Int. Cl.
*H01Q 15/14*    (2006.01)
*H01Q 1/42*    (2006.01)

(52) U.S. Cl.
CPC .......... *H01Q 1/422* (2013.01); *H01Q 15/144* (2013.01)

(58) Field of Classification Search
CPC .......... H01Q 1/422; H01Q 1/28; H01Q 1/285; H01Q 15/144
See application file for complete search history.

(56) References Cited

U.S. PATENT DOCUMENTS

| | | |
|---|---|---|
| 5,323,170 A | 6/1994 | Lang |
| 5,662,293 A | 9/1997 | Hower et al. |
| 7,420,523 B1* | 9/2008 | Ziolkowski ............ H01Q 1/422 |
| | | 343/872 |
| 7,463,212 B1* | 12/2008 | Ziolkowski .............. H01Q 1/42 |
| | | 343/872 |

(Continued)

FOREIGN PATENT DOCUMENTS

| | | |
|---|---|---|
| CN | 108274879 A | 7/2018 |
| CN | 111674122 A | 9/2020 |

(Continued)

*Primary Examiner* — Awat M Salih
(74) *Attorney, Agent, or Firm* — Thorpe North & Western

(57) ABSTRACT

To improve quality of a radome using a cyanate ester resin for a skin layer. A radome is formed of a multilayer structure in which a plurality of skin layers are layered on a surface of a core member. The plurality of skin layers include a first fiber reinforced plastic layer containing the cyanate ester resin and a fiber material and a second fiber reinforced plastic layer containing an epoxy resin and a fiber material. The second fiber reinforced plastic layer is disposed at a position in contact with the surface of the core member. A proportion of a thickness of the second fiber reinforced plastic layer to a thickness of all of the skin layers is preferably 50% or less.

13 Claims, 7 Drawing Sheets

(56) References Cited

U.S. PATENT DOCUMENTS

| | | | |
|---|---|---|---|
| 10,153,546 B2 | 12/2018 | Kolak et al. | |
| 11,621,484 B1 * | 4/2023 | Pieratt | B32B 5/26 343/872 |
| 2018/0311931 A1 * | 11/2018 | Wodzinski | B32B 19/047 |
| 2023/0339206 A1 * | 10/2023 | Shiozaki | B32B 5/024 |

FOREIGN PATENT DOCUMENTS

| | | |
|---|---|---|
| JP | 2007-519298 A | 7/2007 |
| JP | 2017-79448 A | 4/2017 |
| JP | 2019-056040 A | 4/2019 |

* cited by examiner

| Test result | Specimen width | Fp | | $F_0$ | | Peel strength |
| --- | --- | --- | --- | --- | --- | --- |
| Sample number | [mm] | [kg] | | [kg] | | [N/m] |
| 1 | 76.21 | 18.4 | | 12.0 | | 31592 |
| 2 | 76.22 | 18.6 | | 12.0 | | 32577 |
| 3 | 76.26 | 19.0 | | 12.0 | | 34298 |
| 4 | 76.26 | 19.3 | | 12.0 | | 35956 |
| Average value | 76.24 | 18.8 | | 12.0 | | 33606 |
| Standard deviation | 0.02 | 0.4 | | 0.0 | | 1924 |

FIG. 5

RADOME

TECHNICAL FIELD

The present technology relates to a radome.

BACKGROUND ART

In the related art, to improve radio wave transmittance of a radome, various ideas have been made in terms of materials and structures.

As the material of the radome, a material having a low dielectric constant is generally used, and, for example, Fiber Reinforced Plastics (FRP) using a cyanate ester resin is used as a material that allows obtaining the lowest dielectric constant most (for example, see Japan Unexamined Patent Publication No. 2019-056040 A).

In addition, as a structure of a radome, the radome is formed by using a multilayer structure having a sandwich structure in which both surfaces of a core member are covered with skin layers to widen a transmission frequency band (for example, see Japan Unexamined Patent Publication No. 2017-079448 A).

However, the cyanate ester resin has hard and brittle properties and a weak adhesive force with the core member, and therefore the sandwich structure is difficult to be formed. For this reason, there is a problem that a yield in manufacturing the radome is deteriorated and the radome after manufacturing is easily damaged.

SUMMARY

The present technology improves quality of a radome using a cyanate ester resin for a skin layer.

A radome according to an embodiment of the present technology may be a radome including a multilayer structure in which a plurality of skin layers are layered on a surface of a core member. The skin layer may include a first fiber reinforced plastic layer containing a cyanate ester resin and a fiber material and a second fiber reinforced plastic layer containing an epoxy resin and a fiber material. The second fiber reinforced plastic layer may be disposed at a position in contact with the surface of the core member.

In the radome according to an embodiment of the present technology, a proportion of a thickness of the second fiber reinforced plastic layer to a thickness of all of the skin layers is 50% or less.

In the radome according to an embodiment of the present technology, the skin layers are disposed on both surfaces of the core member. A thickness of each of the skin layers disposed on each of the surfaces is ¼ or less of a free space wavelength at a center frequency of a transmission frequency band of the radome.

In the radome according to an embodiment of the present technology, the first fiber reinforced plastic layer contains glass fiber as the fiber material.

In the radome according to an embodiment of the present technology, the first fiber reinforced plastic layer contains quartz fiber as the fiber material.

In the radome according to an embodiment of the present technology, the first fiber reinforced plastic layer contains E-glass fiber as the fiber material.

In the radome according to an embodiment of the present technology, the first fiber reinforced plastic layer contains NE-glass fiber as the fiber material.

In the radome according to an embodiment of the present technology, the core member is formed of a foamed body of an organic resin or a honeycomb core structure.

According to one embodiment of the present technology, the first fiber reinforced plastic layer containing the cyanate ester resin as a main component is used for the skin layer of the radome and the second fiber reinforced plastic layer containing the epoxy resin as a main component is disposed at the position in contact with the surface of the core member. Accordingly, the second fiber reinforced plastic layer functions as an adhesive layer that bonds the core member and the first fiber reinforced plastic layer together, which is advantageous in providing radio wave transmission performance of the radome and strength of the radome in a compatible manner.

According to one embodiment of the present technology, the proportion of the thickness of the second fiber reinforced plastic layer to the thickness of all of the skin layers (a sum of the thicknesses of the first fiber reinforced plastic layer and the thicknesses of the second fiber reinforced plastic layer) is set to 50% or less. Accordingly, it is possible to suppress a decrease in radio wave transmission performance due to arrangement of the second fiber reinforced plastic layer having a higher dielectric constant than the first fiber reinforced plastic layer to a certain range.

According to one embodiment of the present technology, since the thickness of the skin layer is ¼ or less of the free space wavelength at the center frequency of the transmission frequency band of the radome, the radio wave transmission performance of the radome can be satisfactorily maintained.

According to one embodiment of the present technology, since the first fiber reinforced plastic layer contains the glass fiber having the low dielectric constant as the fiber material, the dielectric constant of the fiber reinforced plastic layer can be reduced and the radio wave transmission performance of the radome can be improved.

According to one embodiment of the present technology, since the first fiber reinforced plastic layer contains the quartz fiber having the low dielectric constant as the fiber material, the dielectric constant of the fiber reinforced plastic layer can be reduced and the radio wave transmission performance of the radome can be improved.

According to one embodiment of the present technology, since the first fiber reinforced plastic layer contains the E-glass (electronic glass) fiber as the fiber material, the radome can be produced at a relatively low cost.

According to one embodiment of the present technology, since the first fiber reinforced plastic layer contains the NE-glass (new electronic glass) fiber as the fiber material, the dielectric constant of the first fiber reinforced plastic layer can be lower compared with the case where the E-glass fiber is used and the radio wave transmission performance of the radome can be improved.

According to one embodiment of the present technology, since the core member is formed of the foamed body of the organic resin or the honeycomb core structure, the second fiber reinforced plastic layer functions as the adhesive layer that bonds the core member and the first fiber reinforced plastic layer together, which is advantageous in providing the radio wave transmission performance of the radome and the strength of the radome in a compatible manner.

BRIEF DESCRIPTION OF DRAWINGS

FIG. 5 is a table showing peel test results of multilayer structures in which skin layers are layered on core members.

DETAILED DESCRIPTION

Preferred embodiments of a radome according to an embodiment of the present technology will be described in detail below with reference to the accompanying drawings.

Figure 1:
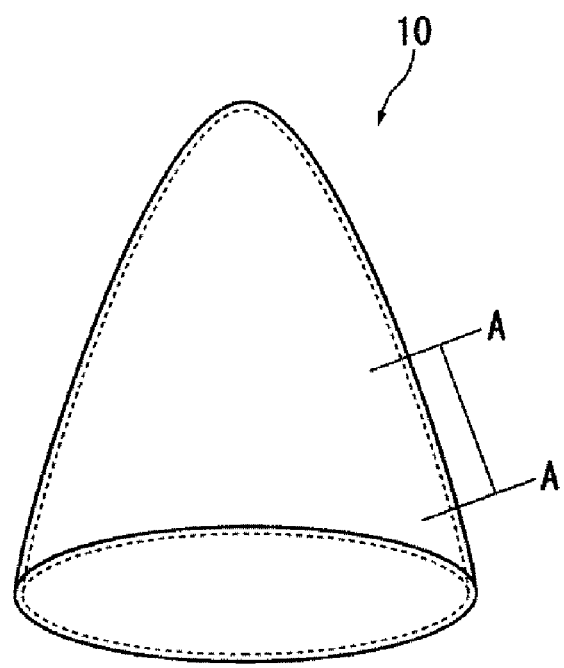
FIG. 1 is an appearance view of a radome according to an embodiment of the present technology.
Figure 2:
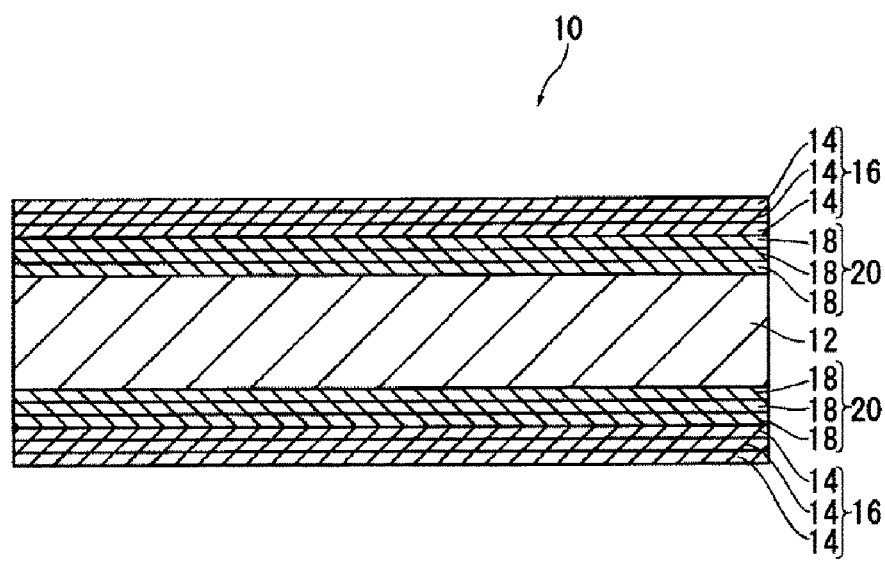
FIG. 2 is an enlarged cross-sectional view of the radome.

FIG. 1 is an appearance view of the radome according to an embodiment. FIG. 2 is an enlarged cross-sectional view (A-A cross-sectional view) of the radome. FIG. 2 omits a curvature in an extension direction of a radome 10.

As illustrated in FIG. 1, the radome 10 is formed in a substantially conical shape, and a radar or the like (not illustrated) is disposed inside the radome 10, for example, disposed at an end portion of an aircraft. Note that the shape of the radome 10 is not limited to the substantially conical shape, and various known shapes, such as a semicircular shape and a polygonal pyramid shape, can be employed.

As illustrated in FIG. 2, the radome 10 is formed of a multilayer structure in which a plurality of skin layers (first fiber reinforced plastic layers 16 and second fiber reinforced plastic layers 20) are layered on surfaces of a core member 12.

The core member 12 is formed of, for example, a foamed body of an organic resin. As the organic resin forming the core member 12 (foamed body), for example, polymethacrylimide (PMI), polyvinyl (PVC), rigid urethane, polyether sulfone (PES), polyimide (PI), and polyethylene terephthalate (PET) can be used.

Further, the core member 12 may be formed of a honeycomb core structure. As the material of the honeycomb core structure forming the core member 12, for example, a resin (aramid), glass fiber, and wood (balsa) can be used.

The plurality of skin layers are formed of respective different types of fiber reinforced plastics. In the present embodiment, the plurality of skin layers include the first fiber reinforced plastic layers 16 containing a cyanate ester resin and a fiber material and the second fiber reinforced plastic layers 20 containing an epoxy resin and a fiber material.

Each of the first fiber reinforced plastic layer 16 and the second fiber reinforced plastic layer 20 is formed by layering one or a plurality of fiber reinforced plastic prepregs 14, 18. In the example of FIG. 2, each of the first fiber reinforced plastic layer 16 and the second fiber reinforced plastic layer 20 is formed by layering the three prepregs 14, 18.

The multilayer structure constituting the radome 10 has a structure in which the first fiber reinforced plastic layer 16, the second fiber reinforced plastic layer 20, the core member 12, the second fiber reinforced plastic layer 20, and the first fiber reinforced plastic layer 16 are layered in this order from one surface side of the multilayer structure and is symmetrical in the thickness direction. That is, in the multilayer structure constituting the radome 10, the second fiber reinforced plastic layers are disposed at positions in contact with the surfaces of the core member 12.

More specifically, assume that each of the first fiber reinforced plastic layer 16, the second fiber reinforced plastic layer 20, and the core member 12 has a first surface and a second surface (a front surface and a back surface), the core member 12 is disposed at the center of the multilayer structure, and the respective first surfaces of the second fiber reinforced plastic layers 20 are disposed to be in contact with the first surfaces and the second surfaces of the core member 12. The respective first surfaces of the first fiber reinforced plastic layers 16 are disposed to be in contact with the second surfaces of the second fiber reinforced plastic layers 20, and the second surfaces of the first fiber reinforced plastic layers 16 form the outer surface of the radome 10.

To manufacture the radome 10, prepregs using an epoxy resin and a fiber material as materials to be the second fiber reinforced plastic layers 20 are layered on the surfaces (the front surface and the back surface) of the core member 12 formed in the shape of the radome 10 by a desired thickness and further, prepregs using a cyanate resin and a fiber material as materials to be the first fiber reinforced plastic layers 16 are layered on the surfaces by a desired thickness, thus forming the multilayer structure. Heat and pressure are applied to the multilayer structure for bonding and curing to form the radome 10.

By providing the first fiber reinforced plastic layer 16 containing the cyanate ester resin, which is a low dielectric constant material, the dielectric constant of the skin layer can be lowered and transmittance of a radio wave can be improved. In addition, by disposing the second fiber reinforced plastic layer 20 containing the epoxy resin having relatively high flexibility at the position in contact with the core member 12, the second fiber reinforced plastic layer 20 functions as an adhesive layer between the core member 12 and the first fiber reinforced plastic layer 16, and strength of the radome 10 (adhesive strength of the first fiber reinforced plastic layer 16) can be improved.

The fiber material contained in the first fiber reinforced plastic layer 16 or the second fiber reinforced plastic layer 20 is, for example, glass fiber, and quartz fiber, E-glass fiber, NE-glass fiber, or the like can be used as the glass fiber. Using the quartz fiber allows reducing the dielectric constant of the fiber reinforced plastic layer and improving radio wave transmission performance of the radome 10. Further, using the E-glass fiber allows producing the radome 10 at a relatively low cost. Using the NE-glass fiber allows reducing the dielectric constant of the fiber reinforced plastic layer and improving the radio wave transmission performance of the radome 10 compared with the case of using the E-glass fiber.

Here, a proportion of the thickness of the second fiber reinforced plastic layer 20 to the thickness of all of the skin layers (the sum of the thicknesses of the first fiber reinforced plastic layer 16 and the second fiber reinforced plastic layer 20) is preferably 50% or less.

Figure 3:
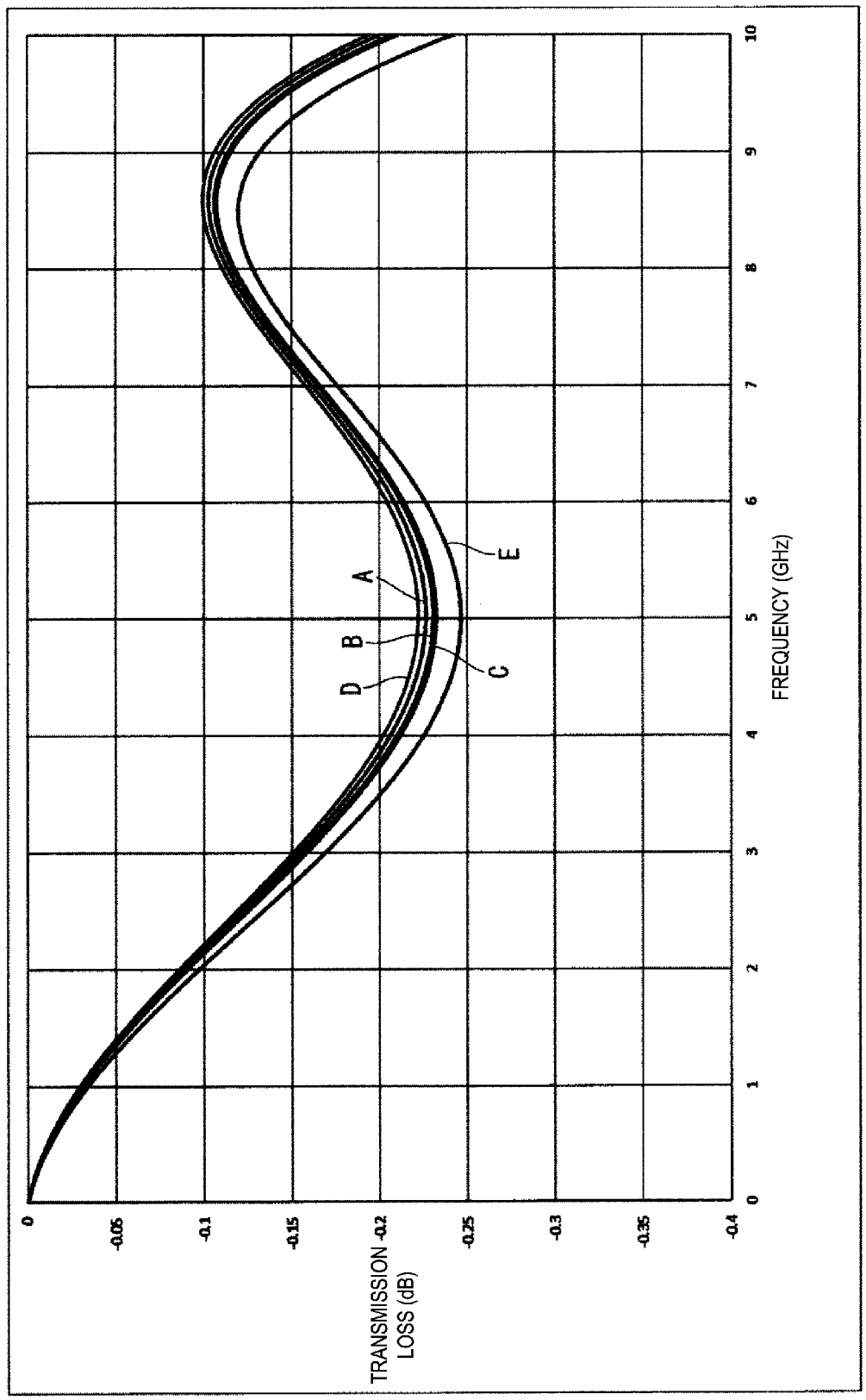
FIG. 3 is a graph showing radio wave transmission characteristics of the radome.

FIG. 3 is a graph showing the radio wave transmission characteristics of the radome and indicates the transmission loss of the radio wave (dB) in the vertical axis and a frequency (GHz) in the horizontal axis.

More specifically, FIG. 3 shows the results of measuring the transmission loss of each of the radomes 10 formed by changing the number of layers of prepregs containing a cyanate ester resin and quartz fiber corresponding to the first fiber reinforced plastic layer 16 (denoted as "cyanate layers" in the drawing) and prepregs containing an epoxy resin and quartz fiber corresponding to the second fiber reinforced plastic layers 20 (denoted as "epoxy layers" in the drawing).

The transmission characteristics of A: the radome 10 of layering five cyanate layers and one epoxy layer per one surface of the core member 12, B: the radome 10 of layering four cyanate layers and two epoxy layers per one surface of the core member 12, C: the radome 10 of layering three cyanate layers and three epoxy layers per one surface of the core member 12, D: the radome 10 of layering six cyanate layers per one surface of the core member 12, and E: the radome 10 of layering six epoxy layers per one surface of the core member 12 are indicated. Excluding D or E having the six layers all of which are made of the same material, similar to the one illustrated in FIG. 2, the layering order of the respective layers is that the epoxy layers are layered so as to be in contact with the core member 12 and the cyanate layers are layered on the epoxy layers.

The core member 12 is 6 mm in thickness, and both of the prepregs of the epoxy and the cyanate are 0.19 mm in thickness.

That is, in A to E, proportions of the contained epoxy and cyanate are changed in the radomes 10 having the same thickness.

Comparing with the transmission losses of the respective radomes 10, the transmission loss of D in which all of the skin layers are formed of the cyanate layers are the lowest, and the transmission performance of the radio wave is good. On the other hand, the transmission loss of E in which all of the skin layers are formed of the epoxy layers is the largest, and the transmission performance of the radio wave is low. In the case where the cyanate layers and the epoxy layers are provided, the transmission loss becomes low in the order of A, B, and C. The more the proportion of the epoxy layers becomes, the larger the transmission loss becomes. On the other hand, a difference in transmission loss between C in which the proportion of the epoxy layers is the largest (50%) and D in which all of the skin layers are formed of the cyanate layers is about 0.01 dB, which is sufficiently practical.

Figure 4:
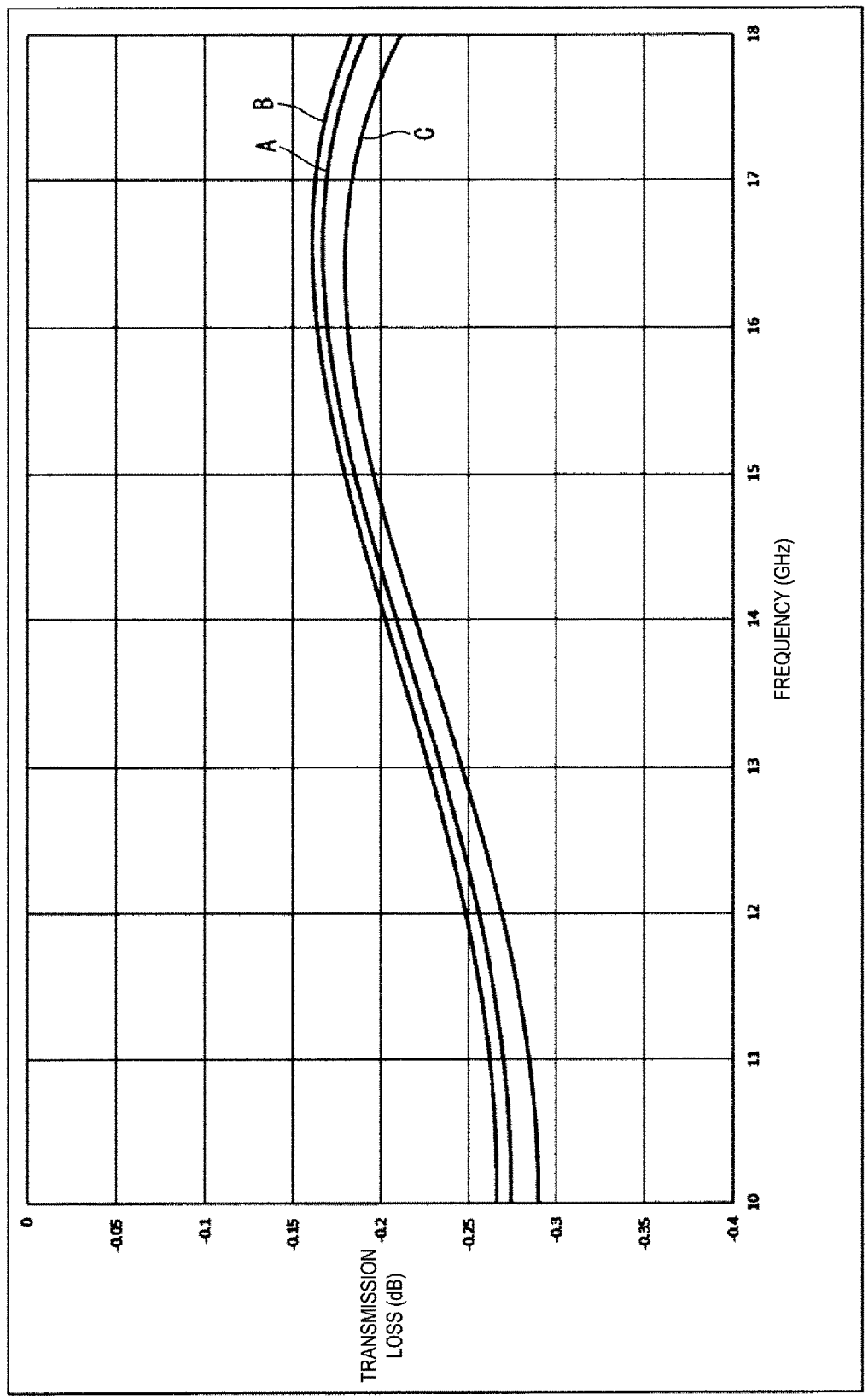
FIG. 4 is a graph showing the radio wave transmission characteristics of the radome.

FIG. 4 is also a graph showing the radio wave transmission characteristics of the radome and indicates the transmission loss of the radio wave (dB) in the vertical axis and the frequency (GHz) in the horizontal axis.

FIG. 4 indicates the transmission characteristics of A: the radome 10 of layering two cyanate layers and one epoxy layer per one surface of the core member 12, B: the radome 10 of layering three cyanate layers per one surface of the core member 12, and C: the radome 10 of layering three epoxy layers per one surface of the core member 12 are indicated.

In FIG. 4 as well, the core member 12 is 6 mm in thickness, and both of the prepregs of the epoxy and the cyanate are 0.19 mm in thickness.

That is, in A to C, proportions of the contained epoxy and cyanate are changed in the radomes 10 having the same thickness.

Comparing with the transmission losses of the respective radomes 10, the transmission loss of B in which all of the skin layers are formed of the cyanate layers are the lowest, and the transmission performance of the radio wave is good. In addition, the transmission loss of C in which all of the skin layers are formed of the epoxy layers is the highest, and the transmission performance of radio wave is inferior. On the other hand, while A of the two cyanate layers and one epoxy layer has the transmission loss larger than that of B, it maintains good transmission performance as compared with C.

As described above, although the adhesive force between the core member 12 and the skin layer is improved by providing the epoxy layer, the transmission performance of the radome 10 deteriorates as the proportion of the epoxy layers in the skin layers increases. Therefore, the thickness of the epoxy layers in the skin layers preferably does not exceed the thickness of the cyanate layers, which are the low dielectric constant layers. That is, the proportion of the thickness of the second fiber reinforced plastic layer 20, which is the epoxy layer, to the thickness of all of the skin layers is preferably 50% or less.

The thickness of the radome 10 is determined by the radio wave transmission performance required for the radome 10. Specifically, the thickness of the skin layers of the radome 10 (the sum of the thickness of the first fiber reinforced plastic layers 16, which are the cyanate layers, and the thickness of the second fiber reinforced plastic layers 20, which are the epoxy layers) needs to be ¼ or less of a free space wavelength at a center frequency of the transmission frequency band required for the radome 10.

Therefore, in the present embodiment, the thickness of the skin layers (the sum of the thickness of the first fiber reinforced plastic layers 16, which are the cyanate layers, and the thickness of the second fiber reinforced plastic layers 20, which are the epoxy layers) is configured to be ¼ or less of the free space wavelength at the center frequency of the transmission frequency band required for the radome 10.

That is, the skin layers are disposed on both surfaces (the front surface and the back surface) of the core member 12, and each of the thicknesses of the skin layers disposed on each of the surfaces is configured to be ¼ or less of the free space wavelength at the center frequency of the transmission frequency band of the radome 10.

FIG. 5 is a table showing peel test results of multilayer structures in which skin layers are layered on core members.

The peel test was conducted in accordance with the standard (ASTM D1781) of the American Society for Testing and Materials as follows.

Figure 6A:
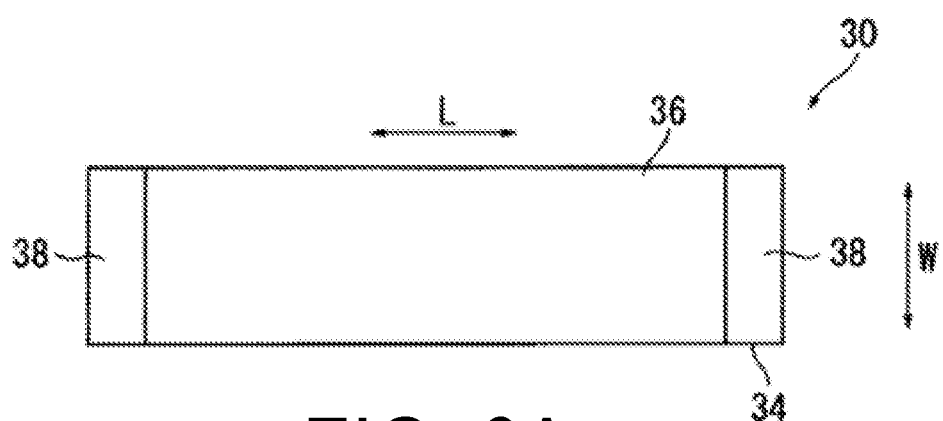
FIGS. 6A-6B are diagrams illustrating a configuration of the multilayer structure used for the test.
Figure 6B:

First, a sample 30 as illustrated in FIGS. 6A-6B was formed.

The sample 30 is a multilayer structure including a core member 32, a first skin layer 34 layered on one surface (test surface) of the core member 32, and a second skin layer 36 layered on the other surface (non-test surface) of the core member 32.

The core member 32 is formed of a foamed body of polyether sulfone (PES). The first skin layer 34 and the second skin layer 36 are formed of prepreg containing an epoxy resin and quartz fiber. The sample 30 is formed by layering the prepregs to be the skin layers 34, 36 on the respective front surface and back surface of the core member 32, and after applying heat and pressure to cure the prepregs, cutting the multilayer structure into a desired size (cutting in the width direction in the present embodiment). Since the purpose of this test is to measure the adhesive strength between the core member and the epoxy layer, layering of the cyanate layers was omitted.

The core member 32 is 6 mm in thickness, the first skin layer 34 is 1.9 mm in thickness, and the second skin layer 36 is 0.38 mm in thickness. The length of the core member 32 in the longitudinal direction (the arrow L direction in FIG. 6A) is 255.0 mm, the length in the width direction (the arrow W direction in FIG. 6A) is about 76.2 mm (with a variation of less than 0.1 mm as will be described later), and the second skin layer 36 is also formed to have the same size as the core member 32. While the length of the first skin layer 34 in the width direction is about 76.2 mm, which is the same as that of the core member 32, the length in the longitudinal direction is 305.0 mm, and surplus portions 38 projecting from both ends of the core member 32 in the longitudinal direction are formed. The surplus portion 38 is sandwiched by a drum portion 42 of a testing device 40 (see FIGS. 7A-7B) described later and is formed to peel the first skin layer 34 from the core member 32.

As shown in FIG. 5, in the present embodiment, the four samples 30 (samples 1 to 4) were produced. The widths of the respective samples 30 were 76.21 mm for the sample 1, 76.22 mm for the sample 2, 76.26 mm for the sample 3, and 76.26 mm for the sample 4 with an average value of 76.24 mm and a standard deviation of 0.02.

Next, the sample 30 is set in the testing device, and measurement is performed after measurement parameters are set as appropriate.

Figure 7A:
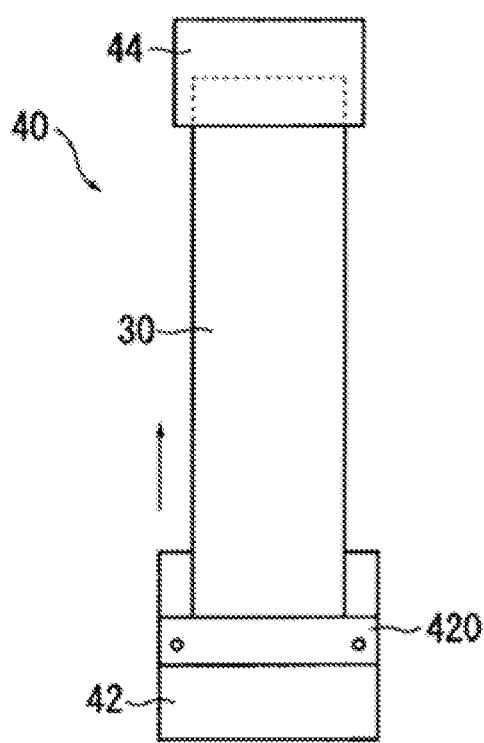
FIGS. 7A-7B are diagrams illustrating a configuration of a testing device.
Figure 7B:
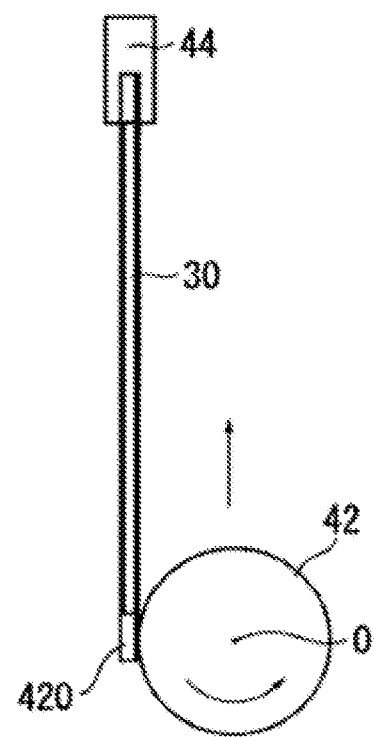

FIGS. 7A-7B illustrate the configuration of the testing device 40. The testing device 40 includes the drum portion 42 and a fixing portion 44. The drum portion 42 and the fixing portion 44 are supported by a frame (not illustrated) and are disposed at positions separated by a predetermined distance at the start of measurement. The drum portion 42 has a cylindrical shape and simultaneously with rotation about an axis O by a driving mechanism (not illustrated), the drum portion 42 linearly moves so as to approach the fixing portion 44. The drum portion 42 includes a holding plate 420 along the axial direction of the cylinder on the outer circumferential surface thereof. One surplus portion 38 of the sample 30 is sandwiched by the holding plate 420. The fixing portion 44 is fixed to be immovable during measurement, and the other surplus portion 38 side of the sample 30 is sandwiched by the fixing portion 44.

The drum portion 42 rotates with the first skin layer 34 sandwiched by the drum portion 42, and the first skin layer 34 is peeled off from the core member 32 by movement of the drum portion 42 in the fixing portion 44 direction. At this time, the testing device 40 measures a load applied to the drum portion 42 and the like to calculate the peel strength of the sample 30.

Specifically, a peel strength T is calculated using the following formula (1).

In the following formula (1), T is a peel strength (kg·cm/7.62 cm), R is a torque arm length (R=R0−Ri=12.7 mm, R0: an outer flange radius where a spring steel is fixed to the drum portion 42, Ri: an inner drum radius around which the first skin layer 34 to be peeled is wound), Fp is an average peel load (kg) of the peel length from 25.4 mm to 152.4 mm of the sample 30, F0 is an average peel load (kg) of the peel length from 25.4 mm to 152.4 mm of the first skin layer 34, and W is the width (mm) of the sample 30. Fp is a load taking the mass of the drum portion 42 into account, and the load of the sample that is not bonded is acquired by F0, and F0 is subtracted from Fp to obtain a value not affected by the mass of the drum portion 42.

In the present embodiment, a cross head speed (pulling speed), which is the movement velocity of the drum portion 42, was set to 25.4±0 25 mm/min.

$$T=[R\times(Fp-F0)]\div W \quad (1)$$

As shown in FIG. 5, the peel loads (N/m) of the samples 1 to 4 are 31592, 32577, 34298, and 35956, respectively and the average value is 33606 (the standard deviation is 1924), which finds that the samples 1 to 4 have sufficient strength.

As Comparative Example, it is conceivable to conduct a peel test on a multilayer structure in which a prepreg containing a cyanate resin and quartz fiber (hereinafter referred to as a "cyanate resin prepreg") is layered on a core member. However, the test was not conducted because the multilayer structure using the cyanate resin prepreg has only an adhesive force at which the cyanate resin prepreg is peeled off by hand and an appropriate result cannot be obtained in the test using the device illustrated in FIGS. 7A-7B.

As described above, according to the radome 10 of the embodiment, the first fiber reinforced plastic layer 16 containing the cyanate ester resin as the main component is used for the skin layer and the second fiber reinforced plastic layer 20 containing the epoxy resin as the main component is disposed at the position in contact with the surface of the core member 12. Accordingly, the second fiber reinforced plastic layer 20 functions as the adhesive layer that bonds the core member 12 and the first fiber reinforced plastic layer 16 together, which is advantageous in providing the radio wave transmission performance of the radome 10 and the strength of the radome in a compatible manner.

According to the radome 10, the proportion of the thickness of the second fiber reinforced plastic layer 20 to the thickness of all of the skin layers (the sum of the thicknesses of the first fiber reinforced plastic layer 16 and the thicknesses of the second fiber reinforced plastic layer 20) is set to 50% or less. Accordingly, it is possible to suppress the decrease in radio wave transmission performance due to the arrangement of the second fiber reinforced plastic layer 20 having the higher dielectric constant than the first fiber reinforced plastic layer 16 to a certain range.

In addition, according to the radome 10, since the thickness of the skin layer is ¼ or less of the free space wavelength at the center frequency of the transmission frequency band of the radome 10, the radio wave transmission performance of the radome 10 can be satisfactorily maintained.

Further, in the radome 10, when the fiber material contained in the first fiber reinforced plastic layer 16 is quartz fiber having the low dielectric constant, the dielectric constant of the first fiber reinforced plastic layer 16 can be lowered to improve the radio wave transmission performance of the radome 10.

In the radome 10, when the fiber material contained in the first fiber reinforced plastic layer 16 is E-glass fiber, the radome 10 can be produced at a relatively low cost.

Further, in the radome 10, when the fiber material contained in the first fiber reinforced plastic layer 16 is NE-glass fiber, the dielectric constant of the first fiber reinforced plastic layer 16 can be lower compared with the case where E-glass fiber is used and the radio wave transmission performance of the radome 10 can be improved.

In the present embodiment, the plurality of skin layers are the first fiber reinforced plastic layers 16 and the second fiber reinforced plastic layers 20, but the present technology is not limited thereto, and three or more types of fiber reinforced plastic layers may be provided. In this case, a fiber reinforced plastic layer containing an epoxy resin and a fiber material (the second fiber reinforced plastic layer 20 in the present embodiment) is disposed at a position in contact with the core member 12, and other fiber reinforced plastic layers are layered thereon.

The invention claimed is:
1. A radome comprising
   a multilayer structure in which a plurality of skin layers are layered on a surface of a core member,
   the skin layer comprising a first fiber reinforced plastic layer containing a cyanate ester resin and a fiber material and a second fiber reinforced plastic layer containing an epoxy resin and a fiber material, and the second fiber reinforced plastic layer being disposed at a position in direct contact with the surface of the core member on both of two opposite sides of the core member, wherein a proportion of a thickness of the second fiber reinforced plastic layer to a thickness of all of the skin layers is 50% or less.

2. The radome according to claim 1, wherein
the skin layers are disposed on both surfaces on the two opposite sides of the core member, and
a thicknesses of each of the skin layers disposed on each of the surfaces is 3/16 or less of a free space wavelength at a center frequency of a transmission frequency band of the radome.

3. The radome according to claim 2, wherein
the first fiber reinforced plastic layer contains glass fiber as the fiber material.

4. The radome according to claim 3, wherein
the first fiber reinforced plastic layer contains quartz fiber as the fiber material.

5. The radome according to claim 3, wherein
the first fiber reinforced plastic layer contains E-glass fiber as the fiber material.

6. The radome according to claim 3, wherein
the first fiber reinforced plastic layer contains NE-glass fiber as the fiber material.

7. The radome according to claim 3, wherein
the core member is formed of a foamed body of an organic resin or a honeycomb core structure.

8. The radome according to claim 1, wherein
the first fiber reinforced plastic layer contains glass fiber as the fiber material.

9. The radome according to claim 8, wherein
the first fiber reinforced plastic layer contains quartz fiber as the fiber material.

10. The radome according to claim 8, wherein
the first fiber reinforced plastic layer contains E-glass fiber as the fiber material.

11. The radome according to claim 8, wherein
the first fiber reinforced plastic layer contains NE-glass fiber as the fiber material.

12. The radome according to claim 1, wherein
the core member is formed of a foamed body of an organic resin or a honeycomb core structure.

13. The radome according to claim 1, wherein the first fiber reinforced plastic layer is disposed to sandwich both the second fiber reinforced plastic layer and the core from the both of the two opposite sides of the core member.

* * * * *